United States Patent [19]

Watson et al.

[11] 4,218,316

[45] * Aug. 19, 1980

[54] METHOD OF CLARIFYING AND REMOVING WATER FROM WATER-SOLIDS SUSPENSIONS

[75] Inventors: Jimmie L. Watson; Patsy L. Totten, both of Duncan, Okla.

[73] Assignee: Halliburton Company, Duncan, Okla.

[*] Notice: The portion of the term of this patent subsequent to Dec. 12, 1995, has been disclaimed.

[21] Appl. No.: 892,726

[22] Filed: Apr. 3, 1978

Related U.S. Application Data

[62] Division of Ser. No. 706,104, Jul. 16, 1976, Pat. No. 4,127,482.

[51] Int. Cl.$^2$ ............................................. C02B 1/20
[52] U.S. Cl. ........................................ 210/51; 210/53
[58] Field of Search .............. 175/66, 72; 209/250, 209/268; 210/42 R, 43, 51–54, 75, 167, 196, 416 R, 416 DW, 497 R, 499; 252/8.5 A–8.5 C

[56] References Cited

U.S. PATENT DOCUMENTS

| | | | |
|---|---|---|---|
| 2,896,915 | 7/1959 | Weiss et al. | 175/72 |
| 2,958,655 | 11/1960 | Brown | 210/54 |
| 3,423,313 | 1/1969 | Messer | 210/54 |
| 3,637,031 | 1/1972 | Hull et al. | 210/54 |
| 3,737,037 | 6/1973 | Bone | 210/54 |
| 3,819,053 | 6/1974 | Milotich | 210/196 |
| 3,935,105 | 1/1976 | McEwen | 210/416 |
| 4,127,482 | 11/1978 | Watson et al. | 210/54 |

*Primary Examiner*—Benoit Castel
*Assistant Examiner*—Peter A. Hruskoci
*Attorney, Agent, or Firm*—Robert S. Nisbett; John H. Tregoning

[57] ABSTRACT

A method of clarifying and removing water from water-solids suspensions wherein the solids are formed into flocculent masses and clarified water is continuously removed by the withdrawal thereof through a screen.

7 Claims, No Drawings

METHOD OF CLARIFYING AND REMOVING WATER FROM WATER-SOLIDS SUSPENSIONS

This is a division of application Ser. No. 706,104, filed July 16, 1976, now U.S. Pat. No. 4,127,482.

The present invention relates generally to the clarification and removal of water from water-solids suspensions, and more particularly, but not by way of limitation, to the removal of clarified water from sumps or pits containing spent aqueous drilling fluids and the like.

In industry waste aqueous solids suspensions are often produced and accumulated in sumps or pits. For example, in the drilling of oil and gas wells, aqueous drilling fluids are commonly utilized. Such drilling fluids contain both cuttings produced in the drilling of the wellbore which are brought to the surface by the drilling fluid and various fluid loss additives, weighting materials and other additives for controlling the fluid loss characteristics, density and other properties of the drilling fluid during use. Commonly, the drilling fluid is circulated down the wellbore being drilled and back to the surface from where it is routed to a sump or pit which functions as an accumulator as well as a settling basin for the heavier cuttings and other solids which settle by gravitation out of the drilling fluid. At the end of the drilling procedure, the aqueous drilling fluid containing suspended solid materials must be disposed of. With the emphasis on environmental protection, the disposal of spent drilling fluids and other similar industrial wastes presents a problem.

Heretofore, in the disposal of water-solids suspensions contained in sumps or pits, solids flocculating additives have been utilized to form the suspended solids into flocculent masses whereby the masses gravitate to the bottom of the pit allowing clarified water to be removed from the top of the pit. Such methods involve numerous treatment steps and are time consuming and expensive. For example, in treating spent aqueous drilling fluids contained in mud pits, the heretofore used methods involve dispersing a solids flocculating additive into the drilling fluid to form suspended solids into flocculent masses, allowing the flocculent masses to settle a short distance and then withdrawing clarified water from the top of the pit. Additional solids flocculating additive is dispersed in the remaining fluid in the pit and after the flocculent masses formed have again settled a short distance, additional clarified water is withdrawn from the top of the pit. This procedure is repeated until a major portion of the water contained in the pit has been clarified and removed, often being incomplete and requiring a long period of time to accomplish, typically a matter of days.

By the present invention an improved method of clarifying and removing water from water-solids suspensions is provided whereby the required quantity of clarified water is removed immediately after forming the suspended solids into flocculent masses thereby significantly reducing the time required, typically to a matter of hours, and therefore, also reducing the expense involved in disposing of such water-solids suspensions.

The improved method of this invention for clarifying and removing water from a sump or pit containing a water-solids suspension comprises the steps of dispersing at least one or more of a particular class of a solids flocculating additive into the water-solids suspension in an amount sufficient to form the suspended solids into flocculent masses of a particular size, and then withdrawing water from the sump through a screen of a size which prevents the flocculent masses from passing therethrough whereby clarified water is continuously removed from the sump without removing the flocculent masses.

While a variety of suspended solids flocculating additives can be utilized in accordance with the present invention to form the solids into flocculent masses of a desired size, certain high molecular weight polyacrylamide flocculating agents have been found to achieve excellent results. A particularly suitable nonionic polyacrylamide flocculating agent for flocculating suspended solids commonly found in aqueous drilling fluids is comprised of a mixture of polyacrylamide, a small amount of an ester of a fatty acid and a small amount of a surface active agent which increases the solubility of the polyacrylamide in aqueous solutions, namely, octyl phenol ethylene oxide. Such a flocculating agent is commercially available from the American Cyanamid Company.

Another polyacrylamide solids flocculating agent which is anionic and particularly suitable for use in treating aqueous drilling fluids is comprised of a mixture of polyacrylamide and an ethylene oxide ester of a fatty acid, also commerically available from the American Cyanamid Company.

Either one of the above flocculating agents can be utilized, but preferably the agents are added in a particular combination to rapidly form flocculent masses of a controlled size, preferably a size in the range of from about 0.1 to about 0.4 centimeters in diameter. In addition, in a preferred form of the present invention, an inorganic salt solution is added to the water-solids suspension prior to or simultaneously with one or both of the above-described flocculating agents to condition the suspended solids. Water soluble inorganic salts of the alkaline earth metals which supply polyvalent cations are preferred, such as calcium, zinc, barium, magnesium, iron, cadmium and strontium. Calcium salts are preferred with the most preferred calcium salt for use in accordance with this invention being calcium sulfate-hemihydrate.

While the salt and flocculating agents described above can be added to or dispersed in the water-solids suspension either alone or together using a variety of techniques, a particularly suitable and presently preferred technique is to add the salt and flocculating agent or agents separately in sequence as aqueous solutions to the suspension. More particularly, the salt is preferably dissolved in fresh water to form an aqueous salt solution which is then added to the water-solids suspension. While the particular concentration of salt in the aqueous solution may vary widely, salt solutions close to saturation are preferred from an economical standpoint. When calcium sulfate-hemihydrate is utilized, it is preferably added to the water-solids suspension in an aqueous solution containing from about 30 percent by weight to about 70 percent by weight calcium sulfate-hemihydrate.

The non-ionic polyacrylamide flocculating agent is preferably dissolved in fresh water to form an aqueous solution containing in the range of from about 0.4 percent by weight to about 1.20 percent by weight flocculating agent. A solubility increasing surface active agent is preferably also added to the aqueous solution. A particularly preferred such surfactant is a monyl phenol ethylene oxide added to the solution in an amount in the range of from about 0.04 to about 0.12 percent by weight.

The anionic polyacrylamide flocculating agent is also preferably added to the water-solids suspension in the form of aqueous solution. That is, the agent is dissolved in fresh water to form an aqueous solution containing in the range of from about 0.04 to about 1.20 percent by weight flocculating agent.

In carrying out the method of the present invention to clarify and remove water from spent aqueous drilling fluids which typically contain suspended solids such as bentonite clays and suspended earth formation solids in an amount of about 5% by volume, a 50 percent by weight aqueous calcium sulfate-hemihydrate solution is first combined and preferably mixed with the drilling fluid in an amount in the range of from about 0.002 to about 0.02 gallons of salt solution per gallon of drilling fluid. The aqueous solution of non-ionic polyacrylamide flocculating agent described above is next dispersed in the drilling fluid in an amount in the range of from about 0.00023 to about 0.452 gallons per gallon of drilling fluid. Finally, the aqueous solution of anionic flocculating agent described above is dispersed in the drilling fluid in an amount in the range of from about 0.00001 to about 0.226 gallons per gallon of drilling fluid. Usually the reaction for each step is practically instantaneous but under certain circumstances it may be desirable to allow a period of time between steps. The suspended solids contained in the drilling fluid form flocculent masses of a size in the range of from about 0.10 to about 0.4 centimeters in diameter. If the flocs formed in the drilling fluid after the salt and flocculating agents are added thereto are smaller in size than desired, additional quantities of the aqueous solution of anionic flocculating agent are added until the flocs reach the desired size.

After the flocs are formed in the drilling fluid, clarified water is removed from the sump or pit containing the drilling fluid by withdrawing the water through one or more screens of a size in the range of from about 10 to about 20 mesh (U.S. Sieve Series). As will be understood, a screen of the above size allows clarified water to pass through the screen at a rapid rate, but prevents the flocculent masses from passing therethrough. A desired number of screens are placed in the sump at the desired or spaced locations after the addition of the last flocculating agent.

A preferred technique for withdrawing the clarified water through a screen of the size mentioned above is to form the screen into a cylinder or an elongated rectangular shape which is closed at one end and attached to an elongated hose at the other end. The hose preferably projects into the screen in a manner such that the screen can be placed on the bottom of the sump in a horizontal position with the other end of the hose connected to the suction connection of a conventional variable rate pump. One or more of such screens with hose attached are placed into the sump and lowered to the bottom thereof after the suspended solids are formed into flocculent masses of the size mentioned above. Once the screen or screens have been placed at the bottom of the sump, they are not moved and the pump is started at an initial low rate of displacement or low pressure differential to remove clarified water from the sump. The rate of withdrawal of the clarified water is gradually increased as the flocculent masses stack up or build a cake which acts as a filter against the screens. After the cake is formed the pressure differential across the screens can be increased and the withdrawal continued until substantially all of the water is removed from the sump. The particular rate of removal of the water from the sump depends upon the quantity of suspended solids and the size of the flocculent masses formed therefrom in the sump and will thus vary according to the pumping rate which can be used without breakdown of the masses.

As will be understood by those skilled in the art, flocculating agents other than those described above can be used in carrying out the method of this invention depending upon the particular quantity, type and characteristic of the solids suspended in the water-solids suspension to be treated. The particular size of the flocs formed and the size and shape of the screen utilized can also vary as can the technique used for dispersing the flocculating additives into the water-solids suspension. Generally, however, excellent results are achieved when the flocs are formed using conventional oil field mixing apparatus to a size in the range of from about 0.1 to about 0.4 centimeters in diameter and a cylindrical screen of a size in the range of from about 10 to about 20 mesh (U.S. Sieve Series) is utilized. This allows clarified water to be continuously removed from the water-solids suspension and the removal of substantially all the water from a normal size drilling fluid sump or pit in less than one day's time.

In order to more clearly illustrate the present invention, the following examples are given.

EXAMPLE I

Test water-solids suspensions are prepared by mixing various quantities of bentonite clay with fresh water. Various quantities of aqueous calcium chloride solution and aqueous solutions of non-ionic and anionic polyacrylamide flocculating agents are then added to the test water-solids suspensions to determine the minimum quantities of salt and flocculating agent solutions required to form the suspended solids into flocculent masses having a minimum size of about 0.10 centimeters in diameter. The results of these tests are given in TABLE I below.

TABLE I

MINIMUM QUANTITIES OF CALCIUM CHLORIDE AND NON-IONIC AND ANIONIC FLOCCULATING ADDITIVES REQUIRED TO FLOCCULATE WATER-BENTONITE SUSPENSIONS

| Water-Bentonite Suspension [1]Pounds Per Barrel Bentonite | Aqueous CaCl$_2$ Solution (2.33 Pounds Per Gallon Water), [2]Gallons Per Barrel | Non-Ionic Flocculating Agent[3] (Aqueous Solution Containing 0.8% by Volume Flocculating Agent), [2]Gallons Per Barrel | Anionic Flocculating Agent[4] (Aqueous Solution Containing 0.8% by Volume Flocculating Agent), [2]Gallons Per Barrel |
|---|---|---|---|
| 0.5 | 0 | 0.012 | 0.006 |
| 10.0 | 0.12 | 2.8 | 1.4 |
| 20.0 | 0.3 | 7.5 | 3.75 |
| 30.0 (Without Dispersant) | 0.4 | 10.5 | 5.25 |

TABLE I-continued
MINIMUM QUANTITIES OF CALCIUM CHLORIDE AND NON-IONIC AND ANIONIC FLOCCULATING ADDITIVES REQUIRED TO FLOCCULATE WATER-BENTONITE SUSPENSIONS

| Water-Bentonite Suspension [1]Pounds Per Barrel Bentonite | Aqueous $CaCl_2$ Solution (2.33 Pounds Per Gallon Water), [2]Gallons Per Barrel | Non-Ionic Flocculating Agent[3] (Aqueous Solution Containing 0.8% by Volume Flocculating Agent), [2]Gallons Per Barrel | Anionic Flocculating Agent[4] (Aqueous Solution Containing 0.8% by Volume Flocculating Agent), [2]Gallons Per Barrel |
|---|---|---|---|
| 30.0 (With Dispersant) | 0.4 | 18.45 | 9.24 |

[1]Pounds per Barrel - Based on 42 Gallon Barrel of Drilling Fluid Contained in Sump.
[2]Gallons Per Barrel - Based on 42 Gallon Barrel of Drilling Fluid Contained in Sump.
[3]Non-Ionic Polyacrylamide Flocculating Agent (American Cyanamid Co. "CYFLOC" 371)
[4]Anionic Polyacrylamide Flocculating Agent (American Cyanamid Co. "CYFLOC" 375)

EXAMPLE II

The tests described in Example I are repeated except that calcium sulfate is substituted for calcium chloride. The results of these tests are given in TABLE II below.

TABLE II
MINIMUM QUANTITIES OF CALCIUM SULFATE AND NON-IONIC AND ANIONIC FLOCCULATING ADDITIVES REQUIRED TO FLOCCULATE WATER-BENTONITE SUSPENSIONS

| Water-Bentonite Suspension, [1]Pounds Per Barrel Bentonite | Aqueous $CaSO_4$ Solution (8.33 Pounds Calcium Sulfate Per Gallon Water) [2]Gallons Per Barrel | Non-Ionic Flocculating Agent[3] (Aqueous Solution Containing 0.8% by Volume Flocculating Agent), [2]Gallons Per Barrel | Anionic Flocculating Agent[4] (Aqueous Solution Containing 0.8% by Volume Flocculating Agent), [2]Gallons Per Barrel |
|---|---|---|---|
| 0.5 | 0 | 0.012 | 0.006 |
| 10.0 | 0.12 | 3.12 | 1.56 |
| 20.0 | 0.24 | 7.20 | 3.60 |
| 30.0 (Without Dispersant) | 0.42 | 9.84 | 4.92 |
| 30.0 (With Dispersant) | 0.42 | 18.48 | 9.24 |

[1]Pounds Per Barrel - Based on 42 Gallon Barrel of Drilling Fluid Contained in Sump.
[2]Gallons Per Barrel - Based on 42 Gallon Barrel of Drilling Fluid Contained in Sump.
[3]Non-Ionic Polyacrylamide Flocculating Agent (American Cyanamid Co. ("CYFLOC" 371)
[4]Anionic Polyacrylamide Flocculating Agent (American Cyanamid Co. "CYFLOC" 375)

EXAMPLE III

Thirty (30) gallons of a fluid simulating a drilling fluid is prepared in a 35 gallon drum by mixing 10 parts per barrel of a commercially available drilling fluid gelling agent (IMCO® gel) and 10 pounds per barrel of a commercially available fluid loss additive (IMCO® Klay) to fresh water using a conventional mixer. After allowing the clays to hydrate overnight, the resulting water-solids suspension is treated as follows:

(1) 0.4 gallons of a 2.33 pounds per gallons aqueous calcium chloride solution is mixed with the suspension, (2) 2.5 gallons of a fresh water solution containing 0.8% by volume of a commercially available non-ionic polyacrylamide flocculating agent having a molecular weight above about 10 million (American Cyanamid Co. "CYFLOC" 371) and 0.08% by volume of a solubility increaser (American Cyanamid Co. Activator 478) is mixed with the suspension, and (3) 1.25 gallons of a fresh water solution containing 0.8% by volume of a commercially available anionic polyacrylamide flocculating agent (American Cyanamid Co. "CYFLOC" 375) is mixed with the suspension.

As a result of the treatment, large flocculent masses are formed which begin to settle. A basket screen is placed directly in the bottom of the drum and clarified water is removed from the drum by pumping through the screen at a rate of 1000 milliliters pre minute until 43% of the water is removed, 500 milliliters per minute until 60% of the water is removed and 286 milliliters per minute until substantially all of the water is removed.

EXAMPLE IV

A pit approximately 155 feet long, 90 feet wide and 8 feet deep contains 20,000 barrels of spent drilling fluid comprised of about 95% by volume water, 3 to 4% by volume suspended solids and 2% by volume oil. The suspended solids are primarily bentonite clay (27.6 pounds per barrel) asbestos, inorganic viscosifier and polyanionic polymer-filtrate reducer. The spent drilling fluid is treated in sequence by first combining a 50% by weight aqueous calcium sulfate-hemihydrate solution therewith in the amount of 8400 gallons. One hundred sixty-eight thousand gallons of an aqueous solution containing 0.8% by weight non-ionic polyacrylamide flocculating agent and 0.08% by weight monyl phenol ethylene oxide is next dispersed into the drilling fluid followed by 84,000 gallons of an aqueous solution containing 0.8% by weight anionic polyacrylamide flocculating agent whereby the solids suspended in the drilling fluid are formed into flocculent masses of an average size of 0.3 centimeters in diameter.

A series of 15 basket screens 5 feet in diameter and 8 feet long formed from 10 mesh screen (U.S. Sieve Series) are lowered to the bottom of the pit and clarified water is pumped through the screens and out of the pit at an initial rate of about 1410 gallons per minute whereby the flocculent masses are not drawn through the screen. As the flocs stack upon one another against the screen and water migrates out of the flocs, channels are formed through which additional water flows. The rate of water removal is increased to about 1890 gallons per minute until the level of fluid in the pit nears the bottom at which time the rate is slowed to about 750 gallons per minute to allow time for water in the flocs to migrate downwardly and through the screen. Twenty-two thousand nine hundred and twenty barrels of clarified water are removed from the pit in a total time of 8 hours.

Thus, the method of the present invention is particularly suitable for clarifying and removing water from waste aqueous drilling fluids and other similar water-solids suspensions contained in sumps, and allows the water to be quickly and conveniently disposed of without incurring environmental pollution. After the water is removed, the sump or pit in which the flocculated solids remain can be quickly filled in or otherwise removed from the site.

What is claimed is:

1. A method of clarifying and removing water from a sump containing water aqueous waste drilling fluid having clay solids suspended therein, comprising the steps of dispersing at least one aqueous solids flocculating additive into said water-solids suspension in an amount sufficient to form said suspended solids into flocculent masses of a size in the range of from about 0.1 to about 0.4 centimeters in diameter; placing a screen attached to a suction means in said sump near the bottom with said screen having a mesh size in the range of from about 10 to about 20 mesh (U.S. sieve series) which prevents said flocculent masses from passing therethrough; withdrawing by suction means water from near the bottom of said sump through said screen without removing said flocculent masses; and removing substantially all of said water from said flocculent masses before disposing of said flocculated solids.

2. The method of claim 1 which is further characterized to include the step of combining an aqueous solution containing an inorganic alkaline earth metal salt with said water-solids suspension prior to dispersing said aqueous solutions containing flocculating agents therein.

3. The method of claim 2 wherein said salt is calcium sulfate-hemihydrate present in said aqueous solution in an amount in the range of from about 30 to about 70 percent by weight and said aqueous salt solution is combined with said water-solids suspension in an amount in the range of at least about 0.002 gallons per gallon of water-solids suspension.

4. A method of claim 1 wherein the flocculating additive is at least one aqueous polyacrylamide flocculating agent.

5. The method of claim 4 wherein said solids flocculating additive is an aqueous solution containing a nonionic polyacrylamide flocculating agent.

6. The method of claim 4 wherein said solids flocculating additive is an aqueous solution containing an anionic polyacrylamide flocculating agent.

7. A method of claim 4 wherein the flocculating additive is at least two aqueous polyacrylamide flocculating agents which are added to the water-solids suspension in sequence, with a nonionic polyacrylamide flocculating agent being added before an anionic polyacrylamide flocculating agent.

* * * * *

UNITED STATES PATENT AND TRADEMARK OFFICE
CERTIFICATE OF CORRECTION

PATENT NO. : 4,218,316
DATED : August 19, 1980
INVENTOR(S) : Watson et al.

It is certified that error appears in the above—identified patent and that said Letters Patent are hereby corrected as shown below:

Column 7, line 19, delete [water].

*Signed and Sealed this*

*Twenty-eighth* Day of *October 1980*

[SEAL]

Attest:

Attesting Officer

SIDNEY A. DIAMOND

*Commissioner of Patents and Trademarks*